(12) United States Patent
Yang

(10) Patent No.: US 7,191,492 B2
(45) Date of Patent: Mar. 20, 2007

(54) SWIVEL STRUCTURE HAVING DIRECTION INDICATION

(75) Inventor: Kuo-Chang Yang, Hsinchu (TW)

(73) Assignee: Quanta Computer Inc., Tao Yuan Shien (TW)

( * ) Notice: Subject to any disclaimer, the term of this patent is extended or adjusted under 35 U.S.C. 154(b) by 29 days.

(21) Appl. No.: 10/944,859

(22) Filed: Sep. 21, 2004

(65) Prior Publication Data

US 2005/0066477 A1 Mar. 31, 2005

(30) Foreign Application Priority Data

Sep. 30, 2003 (TW) .............................. 92217582 U

(51) Int. Cl.
*E05D 11/06* (2006.01)
*G06F 1/16* (2006.01)
(52) U.S. Cl. ........................................ 16/374; 361/683
(58) Field of Classification Search ................. 16/366, 16/374, 376, 351, 319, 343, 297, 300, 235, 16/242, 363, 367, 221; 361/681–683, 803; 379/433.13, 433, 428; 455/90, 556, 550, 455/575

See application file for complete search history.

(56) References Cited

U.S. PATENT DOCUMENTS

| | | | | |
|---|---|---|---|---|
| 4,344,686 A * | 8/1982 | Stemme et al. | ............. | 396/147 |
| 5,168,423 A * | 12/1992 | Ohgami et al. | ............. | 361/681 |
| 5,335,142 A * | 8/1994 | Anderson | .................... | 361/681 |
| 5,873,554 A * | 2/1999 | Nobuchi | .................. | 248/278.1 |
| 5,933,772 A * | 8/1999 | Wolff | ........................ | 455/351 |
| 6,347,433 B1 * | 2/2002 | Novin et al. | .................. | 16/367 |
| 6,587,333 B2 * | 7/2003 | Tseng et al. | ................ | 361/681 |
| 6,798,646 B2 * | 9/2004 | Hsu | ........................... | 361/681 |
| 6,798,649 B1 * | 9/2004 | Olodort et al. | ............. | 361/683 |
| 6,804,861 B2 * | 10/2004 | Hsu | ........................... | 16/366 |
| 6,850,407 B2 * | 2/2005 | Tanimoto et al. | ........... | 361/681 |
| 6,912,122 B2 * | 6/2005 | Chen et al. | ................. | 361/681 |
| 2005/0207104 A1 * | 9/2005 | Love | .......................... | 361/683 |

OTHER PUBLICATIONS

An English-language translation of JP 38-4351, published Mar. 19, 1963.

* cited by examiner

*Primary Examiner*—Robert J. Sandy
*Assistant Examiner*—Andre L. Jackson
(74) *Attorney, Agent, or Firm*—Rabin & Berdo, PC

(57) ABSTRACT

A swivel structure having direction indication is described. The swivel structure includes a first swivel base and a second swivel base. The first swivel base has at least a window and the second swivel base has at least a first direction indication mark and at least a second direction indication mark. The first swivel base and the second swivel base have a first fixed position state and a second fixed position state. The first fixed position state and the second fixed position state switch to each other by swiveling. When in the first fixed position state, the first direction indication marks are shown through the windows and indicate the direction toward the second fixed position state. When in the second fixed position state, the second direction indication marks are shown through the windows and indicate the direction toward the first fixed position state.

10 Claims, 6 Drawing Sheets

SWIVEL STRUCTURE HAVING DIRECTION INDICATION

BACKGROUND

1. Field of Invention

The present invention relates to a swivel structure. More particularly, the present invention relates to a swivel structure having direction indication.

2. Description of Related Art

With the development of optical and semiconductor technology, liquid crystal display (LCD) has been broadly used in electronic display device. LCD has the advantages of high image quality, small size, light weight, low driving voltage, low power consumption, and broad application field. Therefore, LCD has been extensively used in portable televisions, cell phones, video recorders, laptop computers, desktop computers, LCD projectors, and other consumer electronic devices. LCD display is the mainstream display technology.

Generally speaking, the liquid crystal display screen of a laptop computer is secured on the cover of the computer. When using the computer, the cover is tilted opened to show the liquid crystal display. A tilt mechanism is used to connect the cover and the computer base. Thus, the tilt angle of the liquid crystal display can be adjusted by the user.

Because of the advantage of portability of laptop computers, users usually carry them wherever they need the computers to work with. In some situations, the laptop computer may have to show the liquid crystal display in different directions. Some users beside or behind the laptop computer may not clearly see the liquid crystal display because the tilt range and direction of the cover is limited. With the rapid development of software technology, the handwriting recognition system can be integrated with the operation system, and various tablet personal computers having the handwriting recognition feature are provided. Such computers change the way people use computers and have become a milestone of the development of information technology. Such laptop/tablet computer has a handwriting recognition feature, keyboard input function, and fast signal processing ability. The computers are designed for the user who is frequently moving when working. The input interface is suitable to human nature and the liquid crystal display can swivel 180 degrees. Thus, the user can easily carry the computer to other places and other people beside the computer can easily see the display.

The display is able to swivel in two directions. A user may swivel the display in the wrong direction because there is no direction indication on the computer. When the display swivels in the wrong direction, the mechanism between the display and the computer base may be damaged and the signal lines between the display and the computer base may be twisted off.

Therefore, how to provide a swivel structure having direction indication is very important. If the structure is used on a laptop computer, the liquid crystal display can swivel in the direction indicated on the computer to avoid damage caused by swiveling in the wrong direction.

SUMMARY

It is therefore an objective of the present invention to provide a swivel structure having direction indication. The user can swivel the swivel structure in the direction indicated by the direction indication mark. The simple and intuitive direction indication method can be used to prevent damage caused by swiveling in the wrong direction.

It is another objective of the present invention to provide a swivel structure having direction indication. No matter whether the user is beside or behind the front of the screen, the user can clearly see the direction indication marks to prevent confusion about the swiveling direction.

It is still another objective of the present invention to provide a swivel structure having direction indication. The structure is simple and easy to assemble, and the design thereof is easily changed.

In accordance with the foregoing and other objectives of the present invention, a swivel structure having direction indication is described. The structure includes a first swivel base and a second swivel base. The second swivel base holds the first swivel base to allow the first swivel base and the second swivel base to swivel against each other. The second swivel base can have a holding base and a cylinder. The holding base holds the cylinder and the cylinder holds the first swivel base. The swivel structure allows the cylinder to swivel against the first swivel base.

The first swivel base has at least a window. The second swivel base has at least a first direction indication mark and at least a second direction indication mark. The direction indicated by the first direction indication mark is opposite the direction indicated by the second direction indication mark.

The first swivel base and the second swivel base have a first fixed position state and a second fixed position state. When the first swivel base and the second swivel base are in the first fixed position state, the first direction indication mark is shown through the window and the direction indicated by the first direction indication mark is the direction in which the first swivel base and the second swivel base are swiveled to the second fixed position state.

When the first swivel base and the second swivel base are in the second fixed position state, the second direction indication mark is shown through the window and the direction indicated by the second direction indication mark is the direction in which the first swivel base and the second swivel base are swiveled to the first fixed position state.

The swivel structure mentioned above can include a stop tab. When the first swivel base and the second swivel base are in the first fixed position state, the stop tab prevents the user from swiveling the swivel structure in the direction opposite the direction indicated by the first direction indication marks. When the first swivel base and the second swivel base are in the second fixed position state, the stop tab prevents the user from swiveling the swivel structure in the direction opposite the direction indicated by the second direction indication marks.

The first swivel base mentioned above is pivotally connected to a display, and the second swivel base is connected to a computer base. The display, the swivel structure, and the computer base make up a laptop computer. The computer has the function of a tablet computer.

The first direction indication mark and the second direction indication mark are marks attached on the surface of the second swivel base. Examples of the direction indication marks are arrows. Other examples are indication lights with figure.

Because the invention has the windows and the corresponding direction indication marks, together with the stop tabs for limiting the swiveling angle, the swivel structure allows the user to swivel the display in the direction indicated by the direction indication mark. The simple and intuitive direction indication method is used to prevent damage caused by swiveling in the wrong direction. There is more than one direction indication mark on the swivel structure. Therefore, no matter whether the user is beside or behind the front of the screen, the user can clearly see the direction indication marks to prevent confusion about the swiveling direction. Moreover, the structure is simple and easy to assemble, and the design thereof is easily changed.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
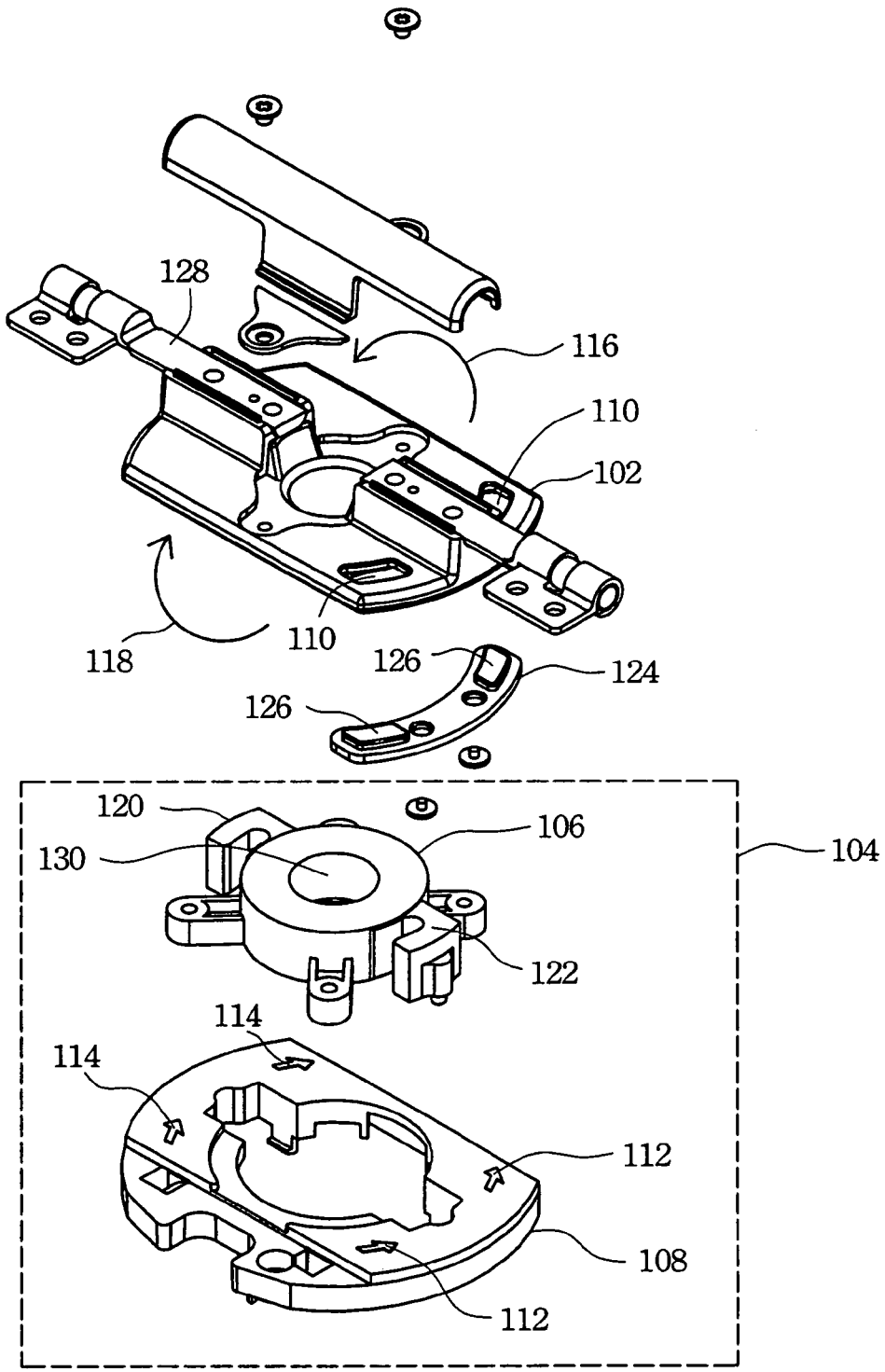
FIG. 1 is a perspective exploded view of the preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a perspective exploded view of the preferred embodiment of the invention. With reference to FIG. 1, the swivel structure 100 having direction indication includes a first swivel base 102 and a second swivel base 104. The second swivel base 104 has a holding base 108 and a cylinder 106. The cylinder 106 has a hole 130 allowing at least a signal line to pass through.

The second swivel base 104 holds the first swivel base 102 to allow the first swivel base 102 and the second swivel base 104 to swivel against each other. More specifically, the cylinder 106 of the second swivel base 104 holds the first swivel base 102 to allow the first swivel base 102 and the cylinder 106 to swivel against each other.

The first swivel base 102 has at least a window 110. The second swivel base 104 has at least a first direction indication mark 112 and at least a second direction indication mark 114.

The first swivel base 102 and the second swivel base 104 have a first fixed position state and a second fixed position state. The first fixed position state and the second fixed position state switch to each other by swiveling. There is a predetermined swiveling angle between the first fixed position state and the second fixed position state. In the embodiment, the predetermined swiveling angle is 180 degrees. Alternate predetermined swiveling angles are, for example, 90 degrees, 270 degrees, 360 degrees or other suitable angles. One skilled in the art is able to determine the swiveling angle between the two states according to the embodiment. These modifications should not be regarded as falling out of the scope of the invention.

Figure 2A:
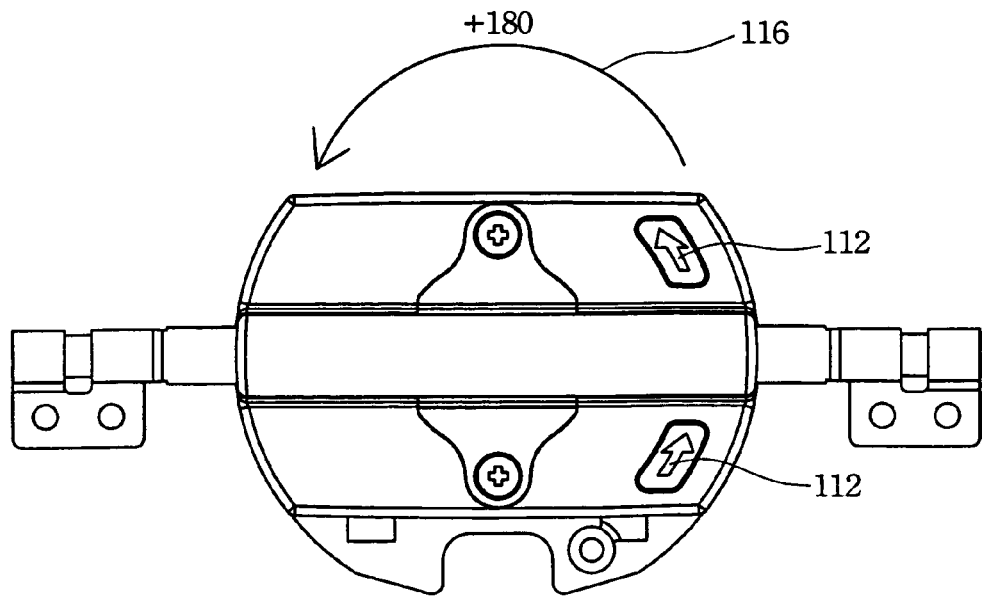
FIG. 2A is a top view of the invention in the first fixed position state.
Figure 2B:
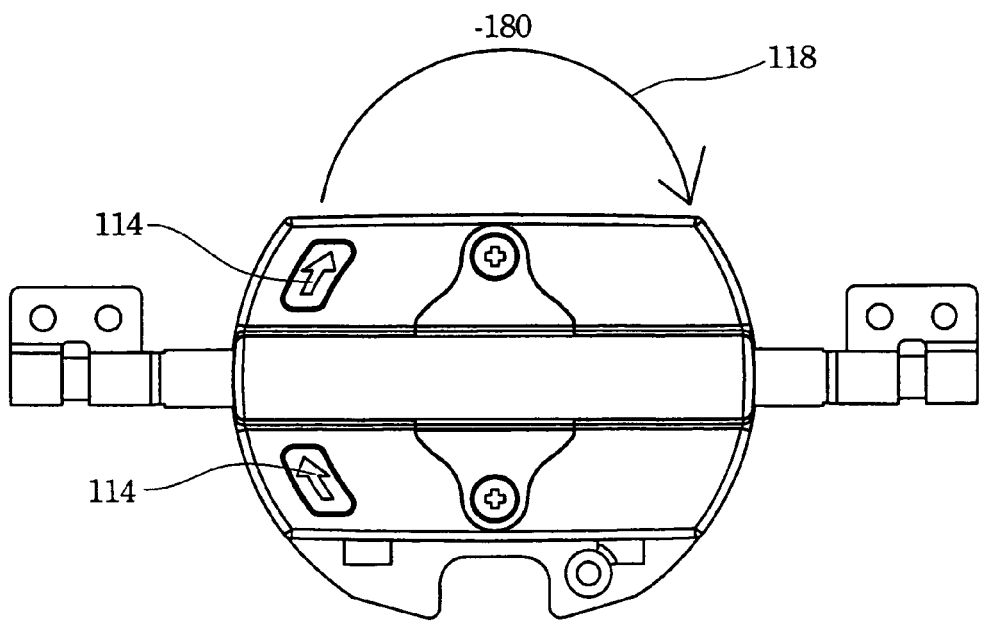
FIG. 2B is a top view of the invention in the second fixed position state.

FIG. 2A is a top view of the invention in the first fixed position state. FIG. 2B is a top view of the invention in the second fixed position state. With reference to FIG. 1 and FIG. 2A, when the first swivel base 102 and the second swivel base 104 are in the first fixed position state, the first direction indication marks 112 are shown through the windows 110. The stop tab 120 prevents the user from swiveling the swivel structure 100 in the direction opposite the direction indicated by the first direction indication marks 112. The direction 116 indicated by the first direction indication marks 112 is the direction in which the first swivel base 102 and the second swivel base 104 are swiveled to the second fixed position state.

With reference to FIG. 1 and FIG. 2B, when the first swivel base 102 and the second swivel base 104 are in the second fixed position state, the second direction indication marks 114 are shown through the windows 110. The stop tab 122 prevents the user from swiveling the swivel structure 100 in the direction opposite the direction indicated by the second direction indication marks 114. The direction 118 indicated by the second direction indication marks 114 is the direction in which the first swivel base 102 and the second swivel base 104 are swiveled to the first fixed position state.

When the first swivel base 102 and the second swivel base 104 are in the first fixed position state, the second direction indication marks 114 are covered by the first swivel base 102. Thus, the user cannot see the second direction indication marks 114. When the first swivel base 102 and the second swivel base 104 are in the second fixed position state, the first direction indication marks 112 are covered by the first swivel base 102. Thus, the user cannot see the first direction indication marks 112.

With reference to FIG. 1, an optional window pad 124 can be attached to the first swivel base 102. The first direction indication marks 112 or the second direction indication marks 114 are shown through the transparent windows 126.

Figure 3:
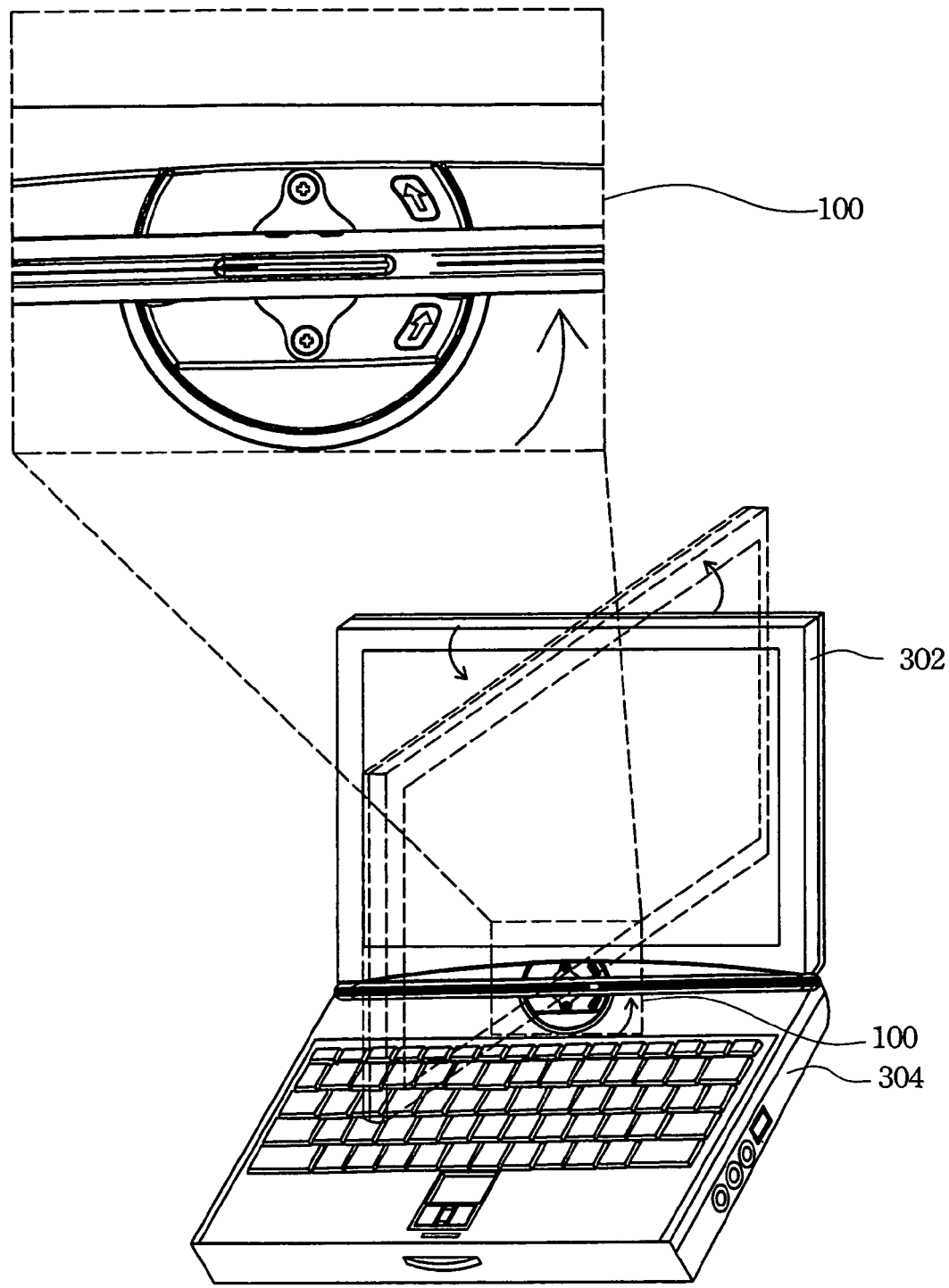
FIG. 3 is a diagram illustrating the swiveling action of a laptop computer.
Figure 4A:
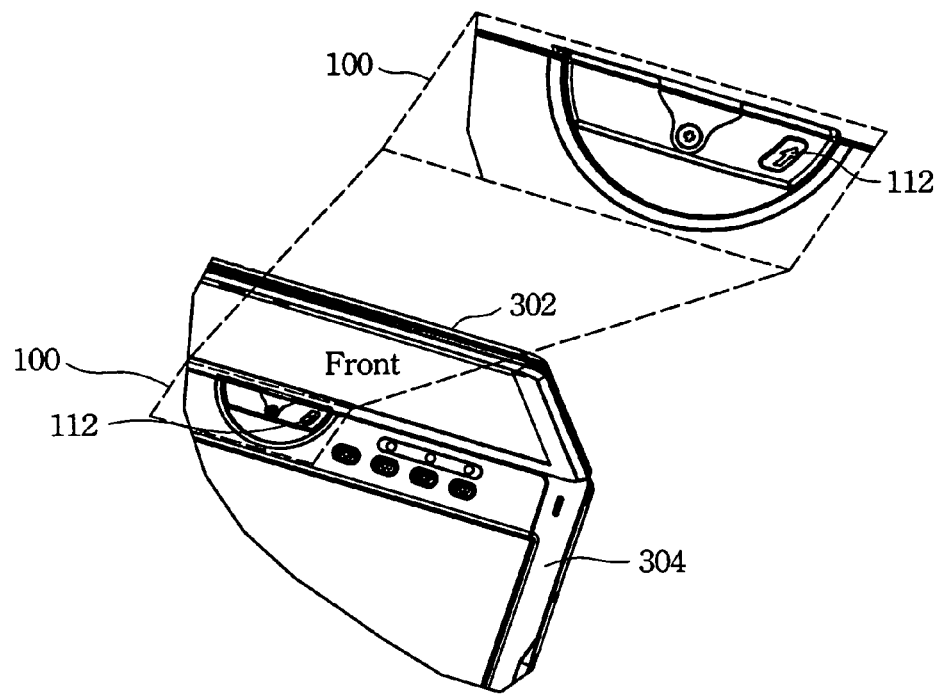
FIG. 4A is an oblique view of the laptop computer in the first fixed position state according to the present invention.
Figure 4B:
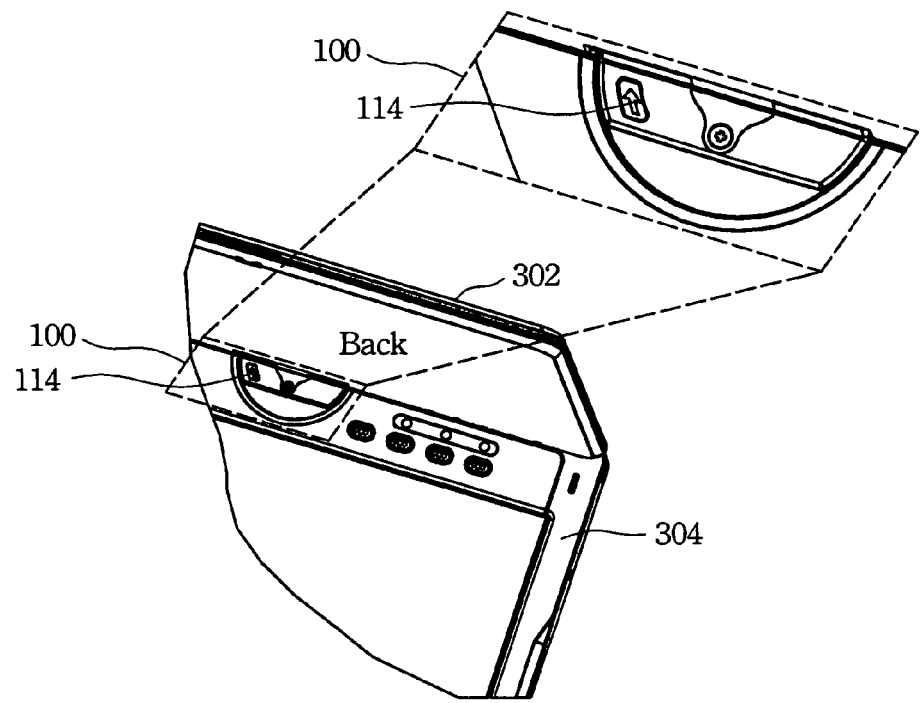
FIG. 4B is an oblique view of the laptop computer in the second fixed position state according to the present invention.
Figure 5A:
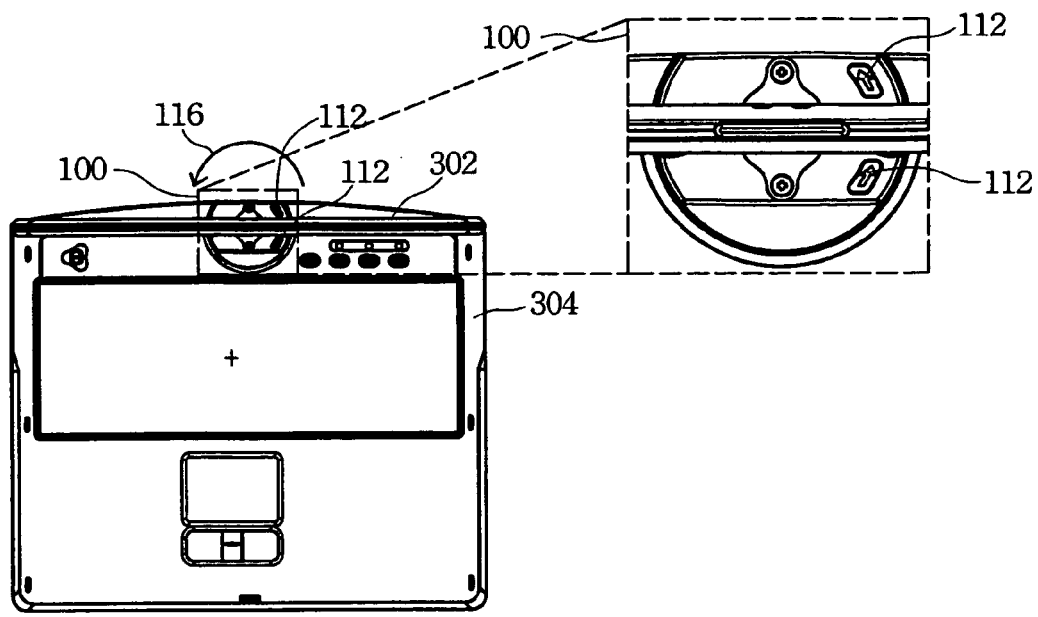
FIG. 5A is a top view of the laptop computer in the first fixed position state according to the present invention.
Figure 5B:
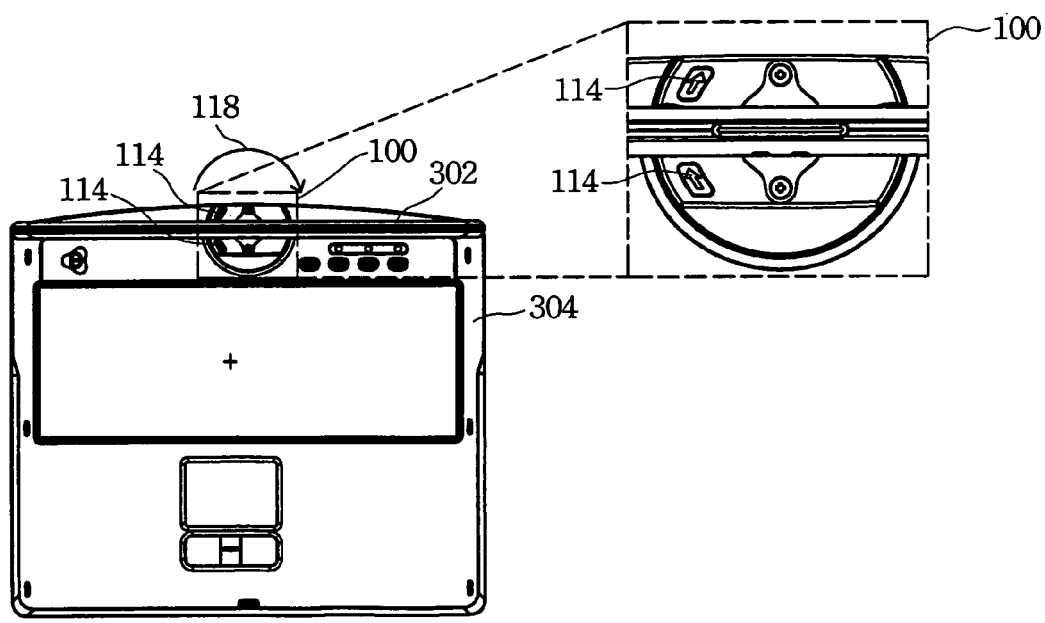
FIG. 5B is a top view of the laptop computer in the second fixed position state according to the present invention.

FIG. 3 is a diagram illustrating the swiveling action of a laptop computer. FIG. 4A is an oblique view of the laptop computer in the first fixed position state. FIG. 4B is an oblique view of the laptop computer in the second fixed position state. FIG. 5A is a top view of the laptop computer in the first fixed position state. FIG. 5B is a top view of the laptop computer in the second fixed position state. With reference to FIG. 1, FIG. 3, FIG. 4A, FIG. 4B, FIG. 5A, and FIG. 5B, the first swivel base 102 has a yoke 128. The first swivel base 102 is pivotally connected to the display 302. The yoke 128 allows the display 302 to be tilted from the computer base 304. The swivel structure 100 also allows the display 302 to swivel about a vertical axis. The display 302 is, for example, a liquid crystal display.

With reference to FIG. 3, FIG. 4A, FIG. 4B, FIG. 5A, and FIG. 5B, the second swivel base 104 is connected to a computer base 304. The computer base 304 is, for example, a main part of a laptop computer or a PDA (personal digital assistant). The swivel structure 100 allows the display 302 to be tilted from the computer base 304 and then swiveled about a vertical axis. The display 302, the computer base 304, and the swivel structure 100 form a computer system. The computer system has both features of a laptop computer and a tablet computer.

With reference to FIG. 1, FIG. 3, FIG. 4A, and FIG. 5A, when the display 302 swivels about the vertical axis, the user can only see the first direction indication marks 112 in the first fixed position state. The user naturally follows the direction 116 indicated by the first direction indication marks 112 to swivel the display 302. Thus, the user is prevented from swiveling the display 302 in the direction 118. Swiveling the display 302 in the wrong direction may damage the stop tab 120 or twist off the signal lines between the display 302 and the computer base 304. FIG. 4A particularly shows that the user can clearly see the first direction indication marks 112 even if the user is facing the front of the display 302.

With reference to FIG. 1, FIG. 3, FIG. 4B, and FIG. 5B, when the display 302 swivels about the vertical axis, the user can only see the second direction indication marks 114 in the second fixed position state. The user naturally follows the direction 118 indicated by the second direction indication marks 114 to swivel the display 302. Thus, the user is prevented from swiveling the display 302 in the direction 116. Swiveling the display 302 in the wrong direction may damage the stop tab 122 or twist off the signal lines between the display 302 and the computer base 304. FIG. 4B particularly shows that the user can clearly see the second direction indication marks 114 even if the user is facing the back of the display 302.

Figure 6A:
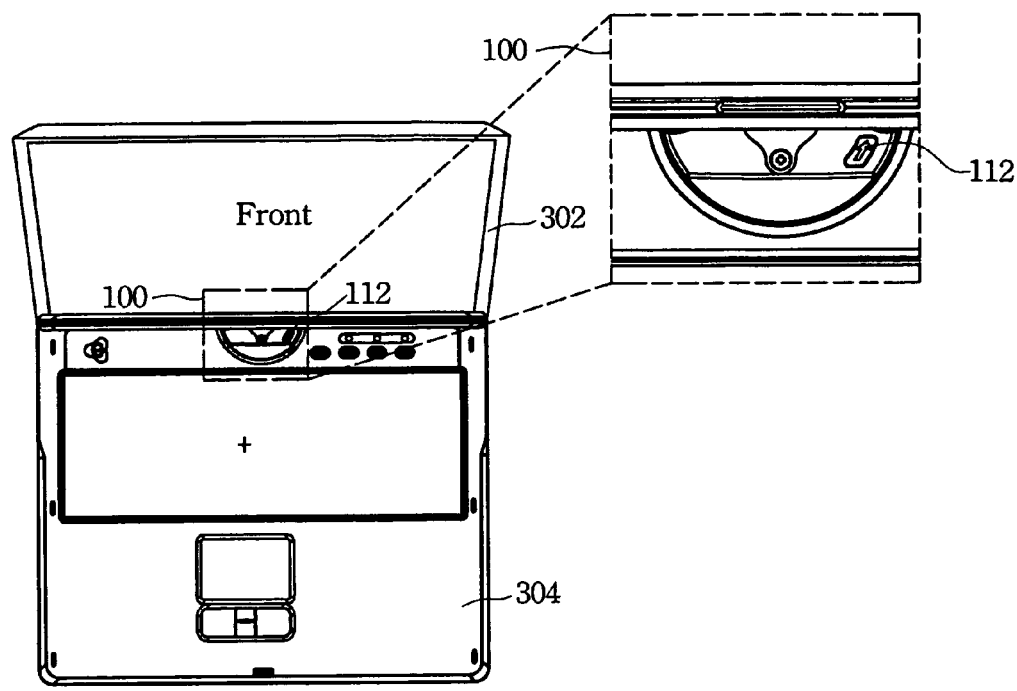
FIG. 6A is a diagram showing a laptop computer in the first fixed position state with the display tilted open according to the present invention.
Figure 6B:
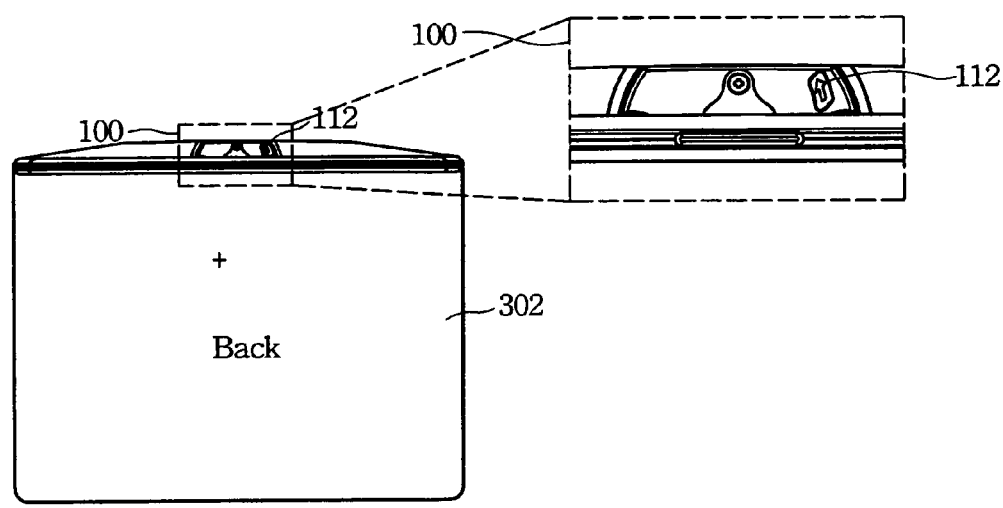
FIG. 6B is a diagram showing a laptop computer in the first fixed position state with the display closed according to the present invention.

FIG. 6A is a diagram showing a laptop computer in the first fixed position state with the display tilted open. FIG. 6B is a diagram showing a laptop computer in the first fixed position state with the display closed. With reference to FIG. 6A, when the first swivel base and the second swivel base are in the first fixed position state and the display 302 is tilted open, the user sees the front of the display 302 and the first direction indication marks 112. The user swivels the display 302 in the direction indicated by the first direction indication marks 112. With reference to FIG. 6B, when the first swivel base and the second swivel base are in the first fixed position state and the display 302 is closed, the user sees the back of the display 302 and the first direction indication marks 112. Therefore, no matter what the tilt angle of the display is, the user can clearly see the first direction indication marks 112 to avoid swiveling the display 302 in the wrong direction. When the first swivel base and the second swivel base are in the second fixed position state, based on the same reason, no matter what the tilt angle of the display is, the user can clearly see the second direction indication marks 114.

As described above, the advantage of the embodiment is that when the display 302 swivels about the vertical axis, in either the first fixed position state or the second fixed position state, the user can clearly see the direction indication marks. Thus, the damage caused by swiveling the display 302 in the wrong direction is avoided.

There are two groups of direction indication marks in the above embodiment and each group includes two direction indication marks. The direction indication marks are, for example, arrows attached on the surface of the second swivel base 104 or indication lights with figures. Any mark capable of indicating direction is can be an alternative direction indication mark. The arrows in the embodiment are just an example. The scope of the invention should not be limited to the arrows.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A swivel structure having direction indication, the swivel structure comprising:
    a first swivel base having at least a window; and
    a second swivel base holding the first swivel base to allow the first swivel base and the second swivel base to swivel against each other, wherein the first swivel base and the second swivel base have a first fixed position state and a second fixed position state, the second swivel base has at least a first direction indication mark and at least a second direction indication mark, and the direction indicated by the first direction indication mark is opposite the direction indicated by the second direction indication mark;
    wherein when the first swivel base and the second swivel base are in the first fixed position state, the first direction indication mark is shown through the window and the direction indicated by the first direction indication mark is the direction to swivel the first swivel base and the second swivel base to the second fixed position state, and when the first swivel base and the second swivel base are in the second fixed position state, the second direction indication mark is shown through the window and the direction indicated by the second direction indication mark is the direction to swivel the first swivel base and the second swivel base to the first fixed position state.

2. The swivel structure of claim 1, wherein the first direction indication mark and the second direction indication mark are indication lights with figure.

3. The swivel structure of claim 1, further comprising a stop tab, wherein when the first swivel base and the second swivel base are in the first fixed position state, the stop tab prevents the user from swiveling the swivel structure in the direction opposite the direction indicated by the first direction indication mark, when the first swivel base and the second swivel base are in the second fixed position state, the stop tab prevents the user from swiveling the swivel structure in the direction opposite the direction indicated by the second direction indication mark.

4. The swivel structure of claim 1, wherein the first swivel base is pivotally connected to a display screen, and the second swivel base is connected to a computer base.

5. The swivel structure of claim 1, wherein the second swivel base has a holding base and a cylinder, the holding base holds the cylinder and the cylinder holds the first swivel base, and the swivel structure allows the cylinder to swivel against the first swivel base.

6. The swivel structure of claim 5, wherein the cylinder has a hole allowing at least a signal line to pass through.

7. The swivel structure of claim 1, wherein the first swivel base has a holding base and a cylinder, the holding base holds the cylinder and the cylinder holds the second swivel base, and the swivel structure allows the cylinder to swivel against the second swivel base.

8. The swivel structure of claim 7, wherein the cylinder has a hole allowing at least a signal line to pass through.

9. The swivel structure of claim 1, wherein the first direction indication mark and the second direction indication mark are marks attached on a surface of the second swivel base.

10. The swivel structure of claim 9, wherein the marks are arrows.

* * * * *